(12) United States Patent
Sage, Jr.

(10) Patent No.: US 6,436,476 B1
(45) Date of Patent: Aug. 20, 2002

(54) POLYOLEFIN FIBER-REINFORCED COMPOSITES USING A FIBER COATING COMPOSITION COMPATIBLE WITH ROMP CATALYSTS

(75) Inventor: Donald Burton Sage, Jr., Amarillo, TX (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/504,050

(22) Filed: Feb. 14, 2000

(51) Int. Cl.⁷ ................................................. B05D 1/36
(52) U.S. Cl. ..................... 427/359; 427/407.3; 427/421; 427/428; 427/443.2; 428/378; 428/426
(58) Field of Search ............................. 427/407.3, 359, 427/428, 443.2, 421; 428/378, 426

(56) References Cited

U.S. PATENT DOCUMENTS

| | | |
|---|---|---|
| 3,090,701 A | 5/1963 | Shulver et al. |
| 3,632,380 A | 1/1972 | Caroselli et al. |
| 3,649,333 A | 3/1972 | Caroselli et al. |
| 3,682,685 A | 8/1972 | Rix et al. |
| 3,919,028 A | 11/1975 | Lewis et al. |
| 4,045,601 A | 8/1977 | Brodmann et al. |
| 4,139,357 A | 2/1979 | Brodmann et al. |
| 4,689,085 A | 8/1987 | Plueddemann |
| 4,849,294 A | 7/1989 | Plueddemann |
| 4,894,276 A | 1/1990 | Bryant |
| 5,055,499 A | 10/1991 | Endo et al. |
| 5,063,103 A | 11/1991 | Sugawara et al. |
| 5,096,644 A | 3/1992 | Endo et al. |
| 5,266,370 A | 11/1993 | Woodson et al. |
| 5,354,829 A | 10/1994 | Swisher et al. |
| 5,428,098 A | 6/1995 | Brekner et al. |
| 5,607,761 A | 3/1997 | Christensen et al. |
| 5,840,238 A | 11/1998 | Setiabudi et al. |
| 6,040,363 A | 3/2000 | Warner et al. |

FOREIGN PATENT DOCUMENTS

| | | |
|---|---|---|
| EP | 176062 A2 * | 4/1986 |
| EP | 0240919 A2 | 10/1987 |
| JP | 11-322957 A2 * | 11/1999 |
| WO | WO99/11454 | 3/1999 |
| WO | WO99/11958 | 3/1999 |

* cited by examiner

Primary Examiner—Erma Cameron
(74) Attorney, Agent, or Firm—Inger H. Eckert; James J. Dottavio; Stephen W. Barns

(57) ABSTRACT

A process for making a composite article comprising providing a coating composition comprising a silane, optional pH modifying agent, and optional lubricant, wherein the silane is compatible with one or more ROMP catalysts used to initiate ring opening metathesis polymerization of the cycloolefin resins; coating fibers with the coating composition; contacting the coated fiber with an uncured cycloolefin resin catalyzed using one or more ROMP catalysts to form a resin and reinforcing fiber material mixture; and curing the resin and reinforcing fiber material mixture to form the composite article.

25 Claims, No Drawings

POLYOLEFIN FIBER-REINFORCED COMPOSITES USING A FIBER COATING COMPOSITION COMPATIBLE WITH ROMP CATALYSTS

TECHNICAL FIELD AND INDUSTRIAL APPLICABILITY OF THE INVENTION

The present invention relates to a process of making a composite article and a composition for coating glass or other fiber reinforcement so as to improve the fiber's compatibility and adhesion to a polyolefin resin.

BACKGROUND OF THE INVENTION

A ring opening metathesis polymerization reaction (ROMP) can polymerize cycloolefins. The cycloolefins usually must be polymerized in the presence of a ROMP catalyst to solidify the composite. ROMP catalysts for polymerization of cycloolefins include ruthenium or osmium carbene compounds, which have proven to be highly effective at initiating ROMP polymerization of cycloolefins. Such catalysts are described, for example, in U.S. Pat. Nos. 5,312,940, 5,342,909, 5,831,108, 5,849,851 and 5,939,504, which are herein incorporated by reference. These catalysts demonstrate a high level of metathesis activity in contrast to previous non-carbene ruthenium and osmium compounds, which were limited by their ability to catalyze only sterically strained cycloolefins. Further, these ruthenium and osmium catalysts do not require the additional use of co-catalyst compounds, and do not suffer from intolerance to moisture.

However, a significant drawback of using these ruthenium and osmium carbene catalysts in the polymerization of typical composite formulations containing cycloolefin resins such as dicyclopentadiene (DCPD), is that the ingredients typically used to prepare the fiber reinforcement material poison these carbene catalysts, thereby reducing or eliminating their effectiveness. The term "poison," as it is used herein with respect to the ingredients used to prepare fiber reinforcement materials, is intended to mean that these ingredients inhibit, slow, prevent or terminate the desired polymerization reaction. For example, some components of conventional sizing or finishing formulations, such as polymers, lubricants and other additives are poisonous to the osmium and ruthenium carbene catalysts and therefore hinder the catalytic reaction needed to cure the resin.

Prior art coating compositions, including sizing and finishing compositions, have not been found that exhibit compatibility with resin matrices cured via ROMP catalysts. While the prior art does teach manufacturing fiber-reinforced composites via ROMP catalysts, such as found in U.S. Pat. No. 5,840,238, herein incorporated by reference, the prior art processes result in an end product that is soft and rubbery, instead of being a hardened and resilient composite. Moreover, the end products of the prior art composites cured via ROMP catalysts also typically exhibit voids around the fibers, which causes the wicking of fluids through or along the composite walls. This incompatibility between the sizing or finish and the catalyst is a significant problem in the art, which has not been addressed.

There is, therefore, a need in the art for a coating composition for reinforcing fibers that is compatible with ROMP catalysts used to cure cycloolefin resins. It is desirable that such a coating composition should also result in composites that exhibit properties indicative of improved adherence between the fibers and the resin matrix, including reduced or negligible wicking, reduced CTE, and increased burst or shear strength.

SUMMARY OF THE INVENTION

The present invention relates to a method of making a composite article comprising:

coating a fiber material with a coating composition comprising a silane, an optional pH modifying agent, and an optional lubricant, wherein said silane is compatible with one or more ring opening metathesis polymerization (ROMP) catalysts used to initiate ring opening metathesis polymerization of the cycloolefin resins, to form a coated fiber material;

contacting the coated glass fiber with an uncured cycloolefin resin and one or more ROMP catalysts, to form a resin, catalyst and fiber mixture; and curing the resin, catalyst and fiber mixture to form the composite article.

The fiber may be heat-treated or heat-cleaned prior to being coated with the coating composition.

The invention also relates to a coated reinforcing fiber material produced according to the process of the present invention.

The present invention further relates to a molded composite article comprising (i) a reinforcing fiber material coated with the coating composition of the present invention, and (ii) a cycloolefin resin polymerized using a ROMP catalyst.

In another embodiment, the invention relates to a coating composition comprising a silane selected from the group consisting of N-2-(vinylbenzylamino)-ethyl-3-aminopropyl-trimethoxysilane, vinyl trimethoxysilane, 3-methacryloxy-1-propyl-trimethoxy silane, norbornenyl triethoxy silane, and norbornenyl methoxy silane; an optional pH modifying agent; and an optional non-ionic or cationic lubricant. The coating composition of the present invention has been shown to be compatible with dicyclopentadiene (DCPD) or other polyolefinic resin-based thermosetting composites that are cured via ROMP and/or free radical induced polymerization. Moreover, the use of this coating composition has demonstrated an improved compatibility with a matrix of polyolefinic resin cured by ROMP, reducing or eliminating voids around the fibers and thereby reducing or preventing wicking of fluids through the composite walls.

The invention additionally comprises a composite article comprising a coated reinforcing fiber material coated with the coating composition of the present invention.

DETAILED DESCRIPTION OF THE PREFERRED EMBODIMENTS OF THE INVENTION

The present invention relates to a coating composition that is highly compatible with ROMP catalysts used in the ring opening metathesis polymerization of cycloolefins. The composition for coating the glass or other fibers has a silane, optional pH modifying agent, and an optional non-ionic or cationic lubricant. The thermosetting polyolefin resin matrix is cured with ROMP catalysts. The coating composition of the present invention is compatible with the ROMP catalysts and improves the adhesion between the fibers and the matrix. The use of this invention produces composites with reduced wicking or no wicking, low thermal expansion with heat, and improved shear and tensile strength.

A "coating" composition, as used herein, refers to a chemical treatment applied to fibers to improve the fibers' compatibility with resin systems used as the matrix in a composite. In particular, the coating is used to improve the processing characteristics of the fiber in whatever process the fiber is subsequently used in next. For example, the coating composition may be a "finish" or chemical mixture that can be applied to a knitted or woven fabric or cloth so as to improve the compatibility of the fabric or cloth with certain resin systems. In this context, the coating composition may be applied to the fabric or cloth after the fabric or cloth has had the sizing removed, for example, by heat cleaning. In another example, the coating may be a "sizing" or chemical mixture that is applied to continuous filaments as they are produced either by spray coating, dip coating, pad coating, or a "kiss" roller. The coating composition is formulated to be chemically compatible with certain resin systems, which are used as the matrix in a composite. The coating composition can further be used as a "binder", which is used to hold together chopped strands or continuous strands in the formation of a mat. Fibers treated with the coating composition of the present invention may be used as the reinforcement in a composite. Other examples of the use of the coating composition of the present invention would be readily acknowledged by one having ordinary skill in the art.

The term "compatible", as used herein, is intended to mean that the coating does not poison the catalyst or interact, in any other way, so as to substantially diminish the effectiveness of the catalyst when it is added to the cycloolefin resin. Moreover, the coating composition, when applied to reinforcing fiber materials used in composite winding, molding or casting, provides desirable properties such as good compatibility with a molding resin, elimination or reduction of wicking, reduced expansion in heat, and improved shear or burst strength. Coating compositions previously known in the art lacked such compatibility with ROMP catalysts, either because the catalysts or required co-catalysts were sensitive to water present on the surface of the reinforcing fiber component; or because the ingredients of these coating compositions suppressed the activity of the ROMP catalysts. While the reason for the effectiveness of the coating compositions of the present invention has not been definitively established, it may be due, in part, to the absence of ionic species, such as salt impurities, in the coating composition. It is believed that these ionic species, if present, could interact with the ROMP catalyst, to deactivate it. Moreover, the silanes of the present invention may include a vinyl group, which reacts with other unsaturated groups within the resin matrix, and may attribute to the effectiveness of the sizing composition of the present invention. It is also thought that the preferred silane, N-2-(vinylbenzylamino)-ethyl-3-aminopropyl-trimethoxysilane, is more effective than other unsaturated silanes due to the fact that the molecule is longer and sterically aids in making the reactive portion of the molecule more "available". As a result of the absence of these reactive functional groups, it is believed that the molecules of the various ingredients of the coating composition cannot react with the catalyst and therefore cannot cause a poisoning effect. In contrast, the conventional coating compositions, including sizings, finishes, and binders, of the prior art contain ionic species, such as salt or certain nucleophilic impurities, which appear to interact adversely with the ROMP catalyst.

The coating composition of the present invention includes a silane, which is compatible with ROMP catalysts. The silane improves the adhesion between the coated fiber surface and the composite matrix resin, by providing functional groups for reaction with the surface molecules of the fiber and the matrix resin, in effect acting as a "bridge" between the inorganic fiber surface and the organic composite matrix resin. Suitable silane coupling agents include ROMP-compatible silanes, such as those commercially available from OSi, Inc., a division of Witco, and Dow Coming, Inc. Examples of these include: n-2-(vinylbenzylamino)-ethyl-3-aminopropyltrimethoxysilane-monohydrogen chloride, commercially available under the tradename "Z-6032" from Dow Coming; an experimental silane available under the tradename "Y15242" from OSi; norbornenyl propyl trimethoxy silane, commercially available under the tradename "Y9181" manufactured by OSi; norbornenyl triethoxy silane, commercially available under the tradename "SIB-0992" manufactured by Gilest; vinyltrimethoxysilane, commercially available under the tradename "A-171" from OSi, Inc., or as "Q9-6300" from Dow Coming Inc.; vinyltriethoxysilane, commercially available under the tradename "A-151" from OSi, Inc.; and methacryloxypropyltriethoxysilane, commercially available under the tradename "A-174" from OSi, Inc. One preferred ROMP compatible silane is n-2-(vinylbenzylamino)-ethyl-3-aminopropyltrimethoxysilane. Such silanes and their uses have been discussed, for example, in U.S. application Ser. No. 60/174,557, filed Jan. 5, 2000, herein incorporated by reference. The silane can be used in an amount of from about 0.05% to about 5.0% by weight based upon the total weight of the coating composition. Preferably, the silane is present in an amount of from about 0.1% to about 5.0% by weight, more preferably 0.1% to about 2.5% by weight of the coating composition. The amount of silane should typically be less than about 5% in water to prevent self-polymerization and to allow hydrolysis to proceed in a timely manner.

The coating composition further optionally comprises a pH modifying agent for adjusting the pH of the composition to a pH of about 2.75 to about 7. While hydrolysis of the silane may proceed over an extended time without adjusting the pH levels, the addition of a pH modifying agent accelerates or promotes the hydrolysis reaction of the silane. Any suitable pH modifying agent may be used provided it does not interfere with the effectiveness of the ROMP catalysts. For example, suitable pH modifying agents include hydrolyzing agents, which promote the hydrolysis of the alkoxy groups on the silane, including volatile organic acids. In addition, carbon dioxide may be used to adjust the pH to enhance the hydrolysis reaction of the silane of the present invention. Preferably, the pH modifying agent can either be subsequently physically removed from the composition by heating, for example, or does not become integrated into the chemical makeup of the composition. Suitable pH modifying agents include, but are not limited to, hydrochloric, acetic, formic, citric, oxalic, and phosphorous acids, and carbon dioxide. Preferably, an effective amount of acetic acid is used as the pH modifying agent. The pH modifying agent is present in the sizing or finishing composition in an amount sufficient to maintain a pH of between about 2.75 to about 7, preferably a pH of between about 3 to about 6, and most preferably a pH of between about 3.25 and 3.75. An effective amount of glacial acetic acid may be from about 0.10% to about 1.50% by weight based upon the total weight of the fiber coating composition. More preferably, about 0.75% to about 1.25% by weight of glacial acetic acid, based upon the total weight of the coating composition, is used.

Optionally, a non-ionic or cationic lubricant may be added to the coating composition. Suitable non-ionic or cationic lubricants include those lubricants that are relatively salt free and are compatible with Ruthenium catalysts. In other words, the non-ionic or cationic lubricant must not poison or diminish the effectiveness of the Ruthenium catalyst. It has been found that such non-ionic lubricants may further clarify the solution containing the silane. Moreover, suitable non-ionic or cationic lubricants may be used to control the texture of the treated fabric. A suitable non-ionic lubricant includes polyethylene glycol ester-based lubricants. The polyethylene glycol ester has an average molecular weight of between 200–1,000, preferably between 300–500. For example, a salt-free PEG 400 monopelargonate ester, which is highly compatible with, and which does not inhibit the cure of DCPD resin, has been found to be suitable for the coating composition. "PEG 400," as used herein, is intended to mean a polyethylene glycol with an average molecular weight of 400. The term "salt-free", as used herein, is intended to mean the absence of substantially any ionic species, residues or functional groups in a preparation containing the pelargonate ester. It has been unexpectedly discovered that this salt-free PEG 400 monopelargonate does not poison the ROMP catalysts, unlike other PEG compounds, which are traditionally used in sizing and finishing formulations. A salt-free PEG 400 monopelargonate is commercially available, for example, as "Emery 2658", from Henkel, Inc. The non-ionic or cationic lubricant may be present in an amount from about 0 to about 2.0% by weight based upon the total weight of the coating composition, and more preferably at from about 0.1 to about 0.5% weight.

Alternatively, it has been found that small amounts of a cationic lubricant that are the reaction product of polyethylenimine with C8 to C12 fatty acids is also an effective lubricant, which does not poison the Ruthenium based ROMP catalysts. Examples of these types of lubricants are taught, for example, in U.S. Pat. No. 4,178,412, herein incorporated by reference. For example, a suitable cationic lubricant is commercially available from Henkel under the trade name "6717" or in dilute form as "6760".

The coating composition of the present invention may also include other ingredients that are compatible with and do not interfere with the effectiveness of the ROMP catalyst. These additional ingredients may include one or more film forming polymers, a non-ionic or cationic lubricant, emulsified waxes, additives, and/or processing aids.

Suitable film forming polymers are those film forming polymers compatible with the ROMP catalyst used to initiate ring opening metathesis polymerization of cycloolefin resins. The film forming polymer improves the wettability of the coating and protects the individual fibers and fiber bundles within the reinforcing fiber material during processing by providing a controlled level of strand integrity, which is the ability of the fibers to adhere together during processing. Suitable film forming polymers may be selected from the group of bis-A epichlorohydrin epoxies, modified epoxies, epoxy-polyesters, epoxy-polyurethanes, epoxy novolac resins, polyvinyl acetates, vinylacrylics, styrenated acrylics, polybutylacrylates, saturated or unsaturated polyesters, polyurethanes, polyamides, paraffin waxes, carnauba waxes, micro-crystalline waxes, polyethylenes, polypropylenes, polycarboxylic acids, polyvinyl alcohols and mixtures thereof. Examples of preferred film forming polymers are: a polyurethane such as "Witcobond 320", which is available commercially as a liquid emulsion from Witco Inc; an acrylic resin such as "NS-7170", which is commercially available from National Starch Inc.; and a styrenated acrylic resin such as "Product No. 3661", which is commercially available from H. B. Fuller Inc. Such film forming polymers, such as Witcobond 320, NS-7170, or Product 3661, for example, may be further useful if a greater stiffness if necessary for the finished fabric.

A suitable emulsified wax may be added to the coating composition. The term "emulsified wax", as used herein, is intended to encompass olefinic wax compounds, including polyethylenes and polypropylenes, or mixtures thereof, that have been emulsified by combination with a suitable surfactant, The addition of a surfactant to emulsify the wax serves to improve the solubility or dispersibility of the emulsified wax in the coating composition. It may also be useful as well to provide a greater stiffness to the finished fabric product, if desired. Suitable emulsified waxes include paraffins, carnauba and polyolefins. Preferably, the emulsified wax is an emulsified paraffin wax. The emulsified paraffin wax acts as a modifier for the one or more film forming polymers in the coating composition, and also acts as a lubricant within the coating composition. An example of a suitable emulsified paraffin wax is "FIBERGLASS X-12", an emulsion that is commercially available from Michelman Inc. or "Velvetol 77-70", available commercially from Rhone Poulenc. The amount of emulsified paraffin wax in the coating composition may range from 0 to about 5% by weight, preferably from about 1% by weight to about 4% by weight, and more preferably about 2.3% by weight, based on the total weight of the coating composition. When the coating composition is applied as a "finish", the emulsified wax is preferably used in an amount of 0% to 1% by weight.

Any suitable processing aid may be used. Suitable processing aids may include one or more compounds selected from the group consisting of salt-free polyethylene glycols (hereinafter "PEG") compounds such as PEG monopelargonate and other PEG fatty acid esters, and polyvinylpyrrolidones. The processing aid is added to facilitate contact between the coating and the fiber surface and then subsequently, contact between the coated fiber and other processing equipment.

In one embodiment of the present invention, the coating composition consists essentially of a silane, a pH modifying agent, and an optional non-ionic or cationic lubricant, which has been found to be compatible with the ROMP catalysts that initiate ring opening metathesis polymerization of cycloolefin resins. Preferably, the silane is N-2-(vinylbenzylamino)-ethyl-3-aminopropyl-trimethoxysilane, the pH modifying agent is acetic acid, and the optional non-ionic or cationic lubricant is PEG 400 monopelargonate ester.

The coating composition of the present invention may be made by any method known to one of ordinary skill in the art. For example, the coating composition may be made by blending the silane and pH modifying agent (if needed) with water for a sufficient time to attain hydrolysis of the silane alkoxy groups so as to make the silane molecule more reactive with the fiber substrate, and then adding the optional components of the coating composition with a diluent or solvent to form a solution or suspension. Suitable diluents or solvents include water, acetone, chlorinated hydrocarbons, alcohols, and dibasic esters. Preferably, the diluent is water. The components such as the silane, optional pH modifying agent, and optional non-ionic or cationic lubricant, are preferably used in amounts effective to formulate a composition with which the reinforcing fibers are coated.

The coating composition of the present invention may be applied to the reinforcing fiber material by any suitable method, to form a coated fiber reinforcing material. For example, the invention may be applied to the reinforcing fiber material after it has been woven or knitted into a fabric as a finish. Alternatively, the coating composition of the present invention may be applied to filaments of a reinforcing fiber material immediately after they are formed in an on-line operation as a sizing, or the composition may be applied, off-line, to unwound strands of reinforcing fiber material that were previously formed and packaged. Further, the invention may be applied as an overcoat to form a binder in the production of chopped strand or continuous strand mats. Methods for applying the coating composition include, but are not limited to, pads, sprayers, rollers or immersion baths.

The present invention may also be used to coat milled fibers or flake glass to make them more compatible with the polyolefin resin. In one embodiment, a solution of the silane is mixed with a flake or milled glass. The excess solution is drained from the mixture and the glass is dried in a fluidized bed or with hot air. The treated glass will improve the Heat distortion temperature and CTE of a composite molded using this invention. The adhesion between the glass and the polyolefin provides a higher composite strength and improved corrosion resistance. In a preferred embodiment, a Z-6032 saline is used to coat the glass as described above.

Preferably, woven or knitted fibers may be heat-treated prior to applying the finishing composition to remove any previously-applied size. For example, a fabric may be woven by conventional means and then heat-cleaned or heat-treated to remove any previously applied size. The fabric is then coated with the composition by simply dipping or spraying the fabric with the coating composition. If it is dipped into the coating composition, the fabric may be wetted with the composition for 1–60 seconds. The wetted fabric is then allowed to dry either by drip drying or by gentle warming in an oven at 100–300° F. for a short period of time. Repeated passes through a bath could be used to increase the amount of the coating composition deposited upon the fabric.

Alternatively, the reinforcing fibers are wetted with a sizing composition as soon as they are formed.

The amount of coating composition that is applied to the surfaces of the reinforcing fiber material may be selected to provide an effective thickness of the composition on the surfaces of the reinforcing fiber material. Accordingly, the effective amount of coating composition that is being applied to the reinforcing fiber material is determined by monitoring the loss on ignition (LOI) value, which is a measure of the amount of coating composition present on the surfaces of the coated reinforcing fiber material. The amount of composition deposited on the surfaces of the reinforcing fiber material, i.e. the pickup, and, inherently, the thickness of the coating may then be adjusted by conventional means, depending on the nature of the reinforcing fiber material being coated and the method of application being used. Such means for adjusting the amount of pickup include varying the applicator speed, increasing or decreasing the concentration of the coating composition, increasing or decreasing the viscosity of the coating solution by adding viscosity modifiers, or by changing the temperature of the coating solution.

For example, where the reinforcing fiber material is a continuous fiber strand, the coating composition may be applied by contacting the fiber strand with a roller applicator containing the coating composition. In such a process, the speed of the roller applicator can be varied to change the amount of coating composition that is applied to the surface of the continuous fiber strand. Accordingly, it is possible to increase or decrease the level of impregnation of the continuous fiber strand with the coating composition, and, accordingly, the amount of coating composition present on the surface of the continuous fiber strand, by decreasing or increasing the speed of the roller applicator. The roller applicator speeds that may be used in the process of coating according to the invention may vary from about 45 feet per minute to 360 feet per minute. Preferably, roller applicator speeds from about 90 fpm to about 215 fpm may be used.

The coated reinforcing fiber material may then be used in continuous form, for example, in the formation of filament wound composites, or as input for a weaving or knitting process to make a fabric. The fabric may subsequently be used in a centrifugal casting process or as input for a RIM, RTM or SCRIMP molding process. In a preferred embodiment, the sizing composition is applied to reinforcing fibers used to manufacture filament wound composite articles, such as pipes. In this respect, the coated reinforcing fibers are impregnated with a catalytically activated cycloolefin resin, and a polymerization reaction allowed to progress until a hardened composite is formed. In another embodiment of the present invention, the coated reinforcing fibers may be laid down as a mat, which is then impregnated with the activated cycloolefin resin to be polymerized. In yet another embodiment, the coated reinforcing fibers are woven or knitted into a fabric that is then impregnated and molded with the activated cycloolefin resin. In yet a further embodiment, fibers sized with the invention may be chopped and "sprayed" and mixed with a suitable resin matrix via a "spray-up" process.

The cycloolefin resin used to form the composite of the present invention includes any suitable cycloolefin that can be polymerized by a ring opening methathesis polymerization reaction. The term "cycloolefin resin" as it is used herein, is intended to include monomers, dimers, trimers, tetramers, pentamers, or oligomers of cycloolefin resins and mixtures of these resins. Typically the cycloolefin resin is a liquid resin which is cured or hardened by the ROMP polymerization process. A suitable cycloolefin may be selected from the group consisting of, but not limited to, cyclobutene, cyclopentene, cycloheptene, cyclooctene, cyclooctadiene, cyclopentadiene, dicyclopentadiene, 7-oxanorbornene, 7-oxanorbornadiene, tetracyclododecadiene, cyclododecene, cyclononadiene, cyclopentadiene trimers or tetramers, and mixtures thereof. The preferred cycloolefin of the present invention is dicyclopentadiene (DCPD). DCPD is commercially available from, for example, B.F. Goodrich as Ultrene-99 having a freezing point of about 68 degrees Fahrenheit. A more preferred resin matrix is DCPD having a 10–50% cyclopentadiene trimer. The addition of the trimer lowers the freezing point of the DCPD below zero degrees Fahrenheit which makes it easier to work with. The addition of the trimer also improves the high temperature performance of the composite by raising the glass transition temperature of the final cured matrix from about 150 degrees Centigrade to 180–190 degrees Centigrade.

The cycloolefin resin may preferably be used in combination with an effective amount of a gel modification agent, which slows the hardening of the cycloolefin resin during the polymerization or curing process and thus allows sufficient time to form and shape the combination of the cycloolefin resin and the reinforcing fiber material. An exemplary composite molding process that describes using a combination of a cycloolefin resin and a gel modification agent is disclosed in U.S. Pat. No. 5,266,370, which is herein incorporated by reference. Any suitable gel modification agent may be used in the composite molding process of the present invention. An example of a suitable gel modification agent is triphenyl phosphine (TPP), which is commercially available, for example, as Product No. T8,440-9, from Aldrich Chemical Co.

Suitable ROMP catalysts that may be used to form the molded composite articles of this invention may be selected from any known in the art, such as ruthenium and osmium catalysts. A ROMP catalyst useful in this invention may be selected from the group consisting of ROMP catalysts described, for example, in U.S. Pat. Nos. 5,312,940, 5,342, 909, 5,831,108, 5,840,238, 5,849,851 and 5,939,504, which are herein incorporated by reference. Preferably, ROMP catalysts suitable for use with the compatible sizing or finish compositions of this invention are ruthenium catalysts and osmium catalysts including those represented by Formula I:

$$(X)(X^1)(L)(L^1)M=C(R)(R^1) \qquad \text{I}$$

in which M is selected from ruthenium or osmium; R and $R^1$ are independently selected from hydrogen, $C_2$–$C_{20}$ alkenyl, $C_2$–$C_{20}$ alkynyl, $C_1$–$C_{20}$ alkyl aryl, $C_1$–$C_{20}$ carboxylate, $C_1$–$C_{20}$ alkoxy, $C_2$–$C_{20}$ alkenyloxy, $C_2$–$C_{20}$ alkynyloxy, aryloxy, $C_2$–$C_{20}$ alkoxycarbonyl, $C_1$–$C_{20}$ alkylthio, $C_1$–$C_{20}$ alkylsulfonyl or $C_1$–$C_{20}$ alkylsulfinyl; each optionally substituted with $C_1$–$C_5$ alkyl, halogen, $C_1$–$C_5$ alkoxy or with a phenyl group optionally substituted with halogen, $C_1$–$C_5$ alkyl or $C_1$–$C_5$ alkoxy; X and $X^1$ are independently selected from any anionic ligand; and L and $L^1$ are independently selected from any neutral electron donor. An anionic ligand is defined as any ligand which, when removed from a metal center in its closed shell electron configuration, has a negative charge. A neutral electron donor is any ligand which, when removed from a metal center in its closed shell electron configuration, has a neutral charge, such as a Lewis base. An example of a preferred ROMP catalyst according to the present invention is phenylmethylenebis (tricyclohexylphosphine) ruthenium dichloride, which is commercially available from Advanced Polymer Technologies, Inc.

The ROMP catalyst is used in amount effective to initiate the polymerization of the cycloolefin resin. This effective amount is proportionate to the batch weight of resin being molded. Accordingly, the weight/weight ratio of cycloolefin resin in relation to the ROMP catalyst in the coating composition may range from about 600:1 to about 1700:1. Preferably, the weight ratio of cycloolefin resin to the ROMP catalyst is approximately 1250:1.

The ROMP catalyst may be dissolved in a solvent before it is combined with the cycloolefin resin for molding. Any suitable solvent may be used to dissolve the ROMP catalyst. Suitable solvents are those that are non-reactive during the polymerization of the activated cycloolefin resin. Examples of suitable solvents include hydrocarbons, toluene, xylene, trichloroethane, methylene chloride and water. A preferred solvent is methylene chloride. Alternatively, the ROMP catalyst may be used without first dissolving it in a solvent.

With the selection of catalyst levels and gel modification agent concentrations and type of monomer used, the cure time may be adjusted and the cure can proceed at room temperature. Alternatively, additional heat may be added once the part has gelled to speed up the reaction time. The selection of the amount of catalyst and gel modification agent are based upon experiments run using the molder's resin of choice with varying amount of catalyst and gel modification agent, at different temperature or with different cure schedules. One would typically measure the Tg of the finished part and select suitable processing and formulation levels, which provide suitable performance in the final composite article In addition, the selection of particular additives may allow full cure to be attained within 30–45 minutes.

The process by which a molded composite article is prepared according to the invention can be accomplished by first dissolving a gel modification agent such as triphenyl phosphine (TPP), in a cycloolefin resin such as DCPD, the cycloolefin resin having been melted by warming to a temperature of from about 90° F. to 120° F. Subsequently, the catalyst, dissolved in a solvent such as methylene chloride, may be added to the combination of the cycloolefin resin and the gel modification agent, and the mixture stirred for approximately two minutes.

The resulting resin mixture may then be combined, by any molding means conventionally known in the art, with a reinforcing fiber material coated according to the present invention. Such molding means include, but are not limited to, resin transfer molding, reaction injection molding, centrifugal casting, filament winding, and compression molding. For example, where the desired composite is a filament-wound composite, strands of the reinforcing fiber material may be pulled through a bath containing the resin mixture, to provide strands impregnated with resin mixture. The impregnated strands may then be wound, for example, on a mandrel, to form a raw composite in the form of a filament wound pipe or ring. This raw composite may be cured by a process including gelling and post-curing according to any method conventionally known in the art. For example, the raw composite may be allowed to gel, preferably at a temperature between 90° F. and 140° F. The gelling is caused by the initiation of polymerization of the cycloolefin resin. The gelled composite may then be fully cured by heating in an oven, for example, at about 275–325° F. for from 1 to 16 hours. After the cure is completed, the composite may be allowed to cool, and then removed from the mandrel. In this manner, an effective ROMP polymerization process using the coated reinforcing fiber material and the combination of a ROMP catalyst and cycloolefin resin according to the present invention can provide a tough, resilient composite. Additionally, as mentioned previously, the coated reinforcing fiber material may also be successfully molded by any other conventional molding means known in the manufacture of fiber-reinforced composites.

The coated reinforcing fiber materials of the present invention include strands, rovings, yarns or threads, in continuous or chopped form, fibrous fabrics, mats and surfacing veils. The term "strand" as used herein, is intended to include a collection of a plurality of individual filaments, typically from about 20–8000 filaments, and preferably from about 200–4000 filaments. Any suitable reinforcing fiber material may be used in the molded composite article of the present invention. The reinforcing fiber material may be made from any suitable molten fiberizable material, or from any fibrous material. Preferably, the reinforcing fiber material is selected from the group consisting of glass, carbon, graphite, aramid (such as Kevlar®) or other polymer fibers, such as Spectra®, natural fibers, or blends thereof, as well as any other fibrous reinforcing materials that may conventionally be used in the manufacture of reinforced composites.

These reinforcing fiber materials, when coated with the coating composition of the present invention and combined with a catalyzed cycloolefin resin, may be molded into composite articles by any molding procedure known in the art. The composite articles of the present invention may include filament wound composites such as pipes, fittings, shafts or waterfront or ocean pilings; or composite articles formed by reaction injection molding (RIM), such as automobile parts, recreational vehicle parts, or chemical process equipment. Other composite articles within the scope of the present invention may be formed by centrifugally casting the cycloolefin resin, catalyst and a woven or knitted fabric or mat made according to the invention described in U.S. Pat. No. 5,266,370, herein incorporated by reference.

In a preferred embodiment, the fabric coated in accordance with the present invention is used to manufacture a centrifugally cast pipe. In this embodiment, the fabric is coated, dried, and then cut to the appropriate dimensions to fit inside the desired finished pipe. The fabric may be rolled around a tube, which is smaller than the inside diameter of the finished pipe. The number of layers and weight of the fabric vary with the diameter of the finished pipe and the expected operating pressure of the finished pipe. The fabric and tube may then be inserted into a mold tube and spun at sufficient revolutions per minute to cause the fabric to unwind from the tube and expand so as to come into contact with the inside surface of the mold tube. The mold tube may be spun at about 50 rpm to about 200 rpm for 1 to 5 minutes to achieve this result. The mold tube is then stopped and the smaller tube is removed. A plug may then be inserted into one end of the mold tube. A pre-weighed amount of the mixture of the resin, catalyst, and additives is then pumped or poured into the open end of mold tube, a plug is placed in the previously open end, and the tube is sealed. The mold tube is then spun with sufficient revolutions per minute to the resin mixture into the fabric and form a composite with the wetted fabric toward the outside of the pipe and the resin-rich layer on the inside of the pipe. For example, the mold tube may be spun at about 50 rpm to about 700 rpm for 20–60 minutes to form the composite in the pipe. Alternatively, the pipe can be cast in two or more steps whereby an initial layer of resin is cured within the mold tube prior to adding the fabric reinforcement. Subsequently, the fabric and additional resin are added, spun, and cured. This allows one to place the fabric more along a central axis within the pipe.

The mold tube and cured pipe is then removed from the spinning apparatus and placed in a post-cure oven for 30–45 minutes at 275–325° F. The post-cure step not only helps finish curing the article, but also helps to volatize any residual monomer to reduce odors. The pipe is then removed from the mold tube and allowed to cool to room temperature.

It has been found that the reinforced fibers coated with the composition of the present invention inhibit wicking or capillary movement of water through or along the fibers. The wicking of the coated strand can be determined by methods known in the art. For example, a reinforced fiber that is used to manufacture a piece of pipe may be analyzed for wicking. In particular, the wicking along a pipe may be determined by taking a section of pipe with both ends cut perpendicular to the axial direction so as to expose the fiber reinforcement layer. Two fittings may be used, one that does not seal the edge, but does seal around the diameter of the pipe on one end, and another that seals from inside of the pipe and leaves the cut edge exposed on the other end of the pipe. The pipe is then pressurized using water pressure, for example, in a range of from 0 to about 400 psig. If there is poor bonding between the reinforcement and the matrix, water leaks out or wicks through the exposed end of the pipe. Failure is noted after a pre-determined amount of time. If no liquid is observed after the predetermined amount of time, the pipe may endure an overnight pressurization to determine whether any wicking may be observed. The pipe "passes" if no wicking is observed after the overnight run. The inventor has observed that composites made according to the present invention have no wicking, which is an indication of an effective adherence bond between the reinforcement and the cycloolefin matrix cured with ROMP catalysts.

In addition, it has been observed that the composites produced according to the present invention have a lower coefficient of thermal expansion (CTE) that prior art composites. CTE is a measure of how much expansion an article undergoes with heat. Any known method of measuring CTE may be used. For example, if the reinforced material is used to make a centrifugally cast pipe, a section of the pipe may be taken for CTE determination. The section of the pipe is placed vertically in a laboratory oven and a flat steel plate is placed on top of the vertical section. A dial indicator can be used to measure the expansion in the composite article as the temperature is increased in the oven from a range of between about 75 to 225° F. The CTE is calculated by dividing the change in length by the original length and dividing that by the overall temperature change. The inventor has found that the composites of the present invention have a substantially reduced CTE of 25–50% less than prior art composite CTE values. This is indicative of the improved adhesion between the treated fiber and the resin matrix that is cured with ROMP catalysts. Moreover, it is an indicator of the greater overall strength of the molded article as a result of this improved adhesion. In particular, the composites exhibit a CTE of less than $3.5 \times 10^{-5}$ inch/inch/° F., preferably less than $2.5 \times 10^{-5}$ inch/inch/° F. It has been found that when the CTE was less than $3.5 \times 10^{-5}$ inch/inch/° F. there was a high probability of creating a suitable composite.

It has further been found that the composites made in accordance with the present invention exhibit greater burst pressures. Burst pressure refers to the pressure at which the pipe "leaks" or catastrophically fails. The burst pressure may be measured by inserting a fixture in both ends of a section of pipe, filling it with water, and hydraulically increasing the water pressure with a pump with a pressure gauge until the pipe either exhibits water on the outside or edges of the pipe, known as "weeping", or the pipe explodes (fails catastrophically). The burst pressure is the pressure noted on the pressure gauge when the pipe fails. The composites of the present invention have shown burst pressures within the range of 450–5,000 psi, preferably 3,500–5,000 psi.

The following examples are representative, but are in no way limiting as to the scope of this invention.

EXAMPLES

Example 1

A coating composition with a concentration of 0.50% of silane was prepared according to the following composition:

| | |
|---|---:|
| Z-6032 | 250 grams |
| Glacial acetic acid | 40 grams |
| Water | 19,710 grams |

A premix is prepared by mixing the acetic acid and water. The Z-6032, which has a formula of N-2-(vinylbenzylamino)-ethyl-3-aminopropyl-trimethoxysilane.monohydrogen chloride @ 40% in methanol, and is manufactured by Dow Corning, was slowly added and allowed to mix for 15–45 minutes in order to ensure complete hydrolysis of the methoxy groups. The concentration of the silane, Z-6032, in water was less than 4–5% to prevent self-polymerization and to allow the hydrolysis to proceed in a timely manner. The acetic acid was added in an amount to bring the pH between 3.25 and 3.75.

Examples 2–7

Various coating compositions according to the present invention, as shown in Table 1 below, were prepared.

TABLE 1

| Component | silane | | Glacial Acetic Acid | | Water | | Additional Ingredients | |
| --- | --- | --- | --- | --- | --- | --- | --- | --- |
| | (grams) | (% by weight) | (grams) | (% by weight) | (grams) | (% by weight) | (grams) | (% by weight) |
| Example 2 A-174 | 14.5 | 0.50 | 10 | 0.50 | 2,000 | 99 | | |
| Example 3 A-171 | 14 | 0.50 | 10 | 0.50 | 2,000 | 99 | | |
| Example 4 A-151 | 18 | 0.50 | 10 | 0.50 | 2,000 | 99 | | |
| Example 5 Y15242 | 100 | 1.0 | 50 | 0.50 | 9,550 | 95.5 | 300 isopropanol | 3.0 |
| Example 6 Y-9181 | 100 | 1.0 | 50 | 0.50 | 9,550 | 18.1 | 300 isopropanol | 3.0 |
| Example 7 SIB-0992 | 100 | 1.0 | 50 | 0.50 | 9,550 | 18.1 | 300 isopropanol | 3.0 |

The above compositions were made according to the method set forth in Example 1. In the above compositions, the silanes utilized included "A-174", which is methacryloxypropyltriethoxysilane commercially available from Witco/OSi, "A151", which is vintyltriethoxysilane commercially available from OSi, "A-171", which is vinyltrimethoxysilane commercially available from Witco/OSi, "Y15242", which is an experimental silane from OSi capable of compatible with the ROMP reaction, "Y9181", which is norbornyl propyl trimethoxy silane commercially available from OSi, and "SIB-0992", which is norbornenyl triethoxy silane commercially available from Gilest.

Example 8

Fiber reinforcing materials, in the form of glass fabrics available from BGF Industries as 1800/537 (a 10 ounce per square foot woven fabric), were heat-treated to remove any previously applied size. The heat-treated fabrics were then treated with each of the finish compositions of Examples 1–4. The fabric was coated simply by dipping the fabric into the composition of Examples 1–4 for 5–60 seconds. The fabric was allowed to dry either by allowing the wetted fabric to "drip dry" for 16 hours and then by gently warming the fabric in an oven at 100–300° F. for about 5 minutes.

Example 9–13

The fabric coated with the composition of the present invention was used to manufacture centrifugally cast pipes. In particular, the dried fabrics were cut and then rolled around a tube having a smaller dimension than inside the finished pipe. The fabric and tube were inserted into a mold tube and spun to cause the fabric to unwind from the tube and expand so as to contact the inside surface of the mold tube. Once the spinning of the mold tube ceased, the smaller tube was removed. A plug was then inserted into the mold tube on each end of the mold tube. A mixture of resin and catalyst were then poured into the mold tube and the mold tube was sealed. The mold tube was spun to cause the resin mixture to be impregnated into the fabric and form the composite with the wetted fabric toward the outside of the pipe, and the resin-rich layer inside the pipe. The mold tube and cured pipe were then removed from the spinning apparatus and placed in a post-cure oven from 30–45 minutes at 275–325° F. The pipe was removed from the mold tube, the ends were trimmed, and allowed to cool to room temperature.

A more suitable grade or style of fabric is designated as 3703. It is a 19-ounce per square foot fabric made from yarns with a yardage of 1800 yards per pound. It is woven so it has twice as many strands in the length direction as it does in the hoop or axial direction when it is used to make the centrifugally cast pipe. The higher fabric weight gives added strength and the presence of more glass further reduces the CTE. Generally, a sufficient width of fabric is cut so as to result in one or more plys or layers of fabric in the finished composite.

The pipe was analyzed for wicking, burst pressure, and CTE. The results are set forth in Table 2 as follows:

TABLE 2

| Example | Composition | Dry Schedule | Fabric/Plys | Wicking | Burst Pressure | CTE (in/in/° F. × $10^{-5}$) |
| --- | --- | --- | --- | --- | --- | --- |
| No Reinforcement | None | None | None | None | 1500 | 4.5 |
| Control | Untreated | None | 3703 2 plys | Very high | 450 | 4.2 |
| Example 9 | Z-6032 (from Example 1) | 18 hr air dry | 3703 1 ply | None | 4600 | 2.8 |
| Example 10 | Z-6032 (from Example 1) | 18 hr air dry | 1800/737 1 ply | None | 1900 | 3.0 |
| Example 11 | A-174 (from Example 2) | 18 hr air dry | 1800/737 1 ply | None | N/A | 3.2 |
| Example 12 | A-171 (from Example 3) | 18 hr air dry | 1800/737 1 ply | None | N/A | 3.3 |

TABLE 2-continued

| Example | Composition | Dry Schedule | Fabric/Plys | Wicking | Burst Pressure | CTE (in/in/° F. × 10$^{-5}$) |
|---|---|---|---|---|---|---|
| Example 13 | A-151 (from Example 4) | 18 hr air dry | 1800/737 1 ply | None | N/A | 3.4 |
| Example 14 | Z-6032 (from Example 1) | 18 hr air dry | 3703 2 plys | None | 4500 | 1.8 |

The best results obtained were for the composition of Example 9 and 14, wherein the silane was Z-6032. The Z-6032 silane composition used in Example 9 coated a fabric having one ply and in Example 14 coated a fabric having two plys. In both examples, no wicking along the pipe was found indicating that there is a strong adhering bond between the reinforced fiber material and resin material to prevent any voids along the fibers. Moreover, a burst pressure was indicated to be at 4,500–4,600 psi, which further emphasizes the compatibility between the coating composition of the present invention with the ruthenium catalyst used to cure to the polyolefin resin. Finally, the CTE of 1.8 to 2.8×10$^{-5}$ in/in/° F. is 25–50% less than prior art composites, further indicating the improved adhesion between the treated fiber and matrix, as well as the overall greater strength of the molded article.

It is believed that Applicants' invention includes many other embodiments which are not herein specifically described, accordingly this disclosure should not be read as being limited to the foregoing examples or preferred embodiments.

What is claimed is:

1. A process for making a composite article comprising:
    coating a fiber material with a coating composition comprising a silane which is N-2-(vinylbenzylamino)-ethyl-3-aminopropyl-trimethoxysilane, an optional pH modifying agent, and an optional lubricant, wherein the silane is compatible with one or more ring opening metathesis polymerization (ROMP) catalysts used to initiate ring opening metathesis polymerization of a cycloolefin resin to form a coated fiber material;
    contacting the coated fiber material with an uncured cycloolefin resin and one or more ROMP catalysts selected from ruthenium or osmium ROMP catalysts, to form a resin, catalyst and fiber mixture; and
    curing the mixture to form the composite article.

2. The process of claim 1, wherein prior to coating, the fiber material is heat-treated to remove previously applied sizing.

3. The process of claim 1, wherein the coating composition further comprises a pH modifying agent selected from the group consisting of hydrochloric acid, acetic acid, formic acid, citric acid, oxalic acid, phosphorous acid, and carbon dioxide.

4. The process of claim 3, wherein said pH modifying agent is acetic acid.

5. The process of claim 1, wherein said pH modifying agent is acetic acid.

6. The process of claim 5, wherein said N-2-(vinylbenzylamino)-ethyl-3-aminopropyl-trimethoxysilane is present in an amount from about 0.05 to about 5.0 weight percent of the coating composition and said acetic acid is present in an amount sufficient to give the coating composition a pH of between about 2¾ and about 7.

7. The process of claim 1, wherein said coating composition further comprises a lubricant.

8. The process of claim 7, wherein said lubricant is a polyethylene glycol ester.

9. The process of claim 1, wherein said fiber material is a glass fabric or cloth.

10. The process of claim 1, wherein the coating comprises drawing the fiber through a bath over a roller applicator covered with the coating composition.

11. The process of claim 1, wherein the coating is accomplished using sprayers, pads, rollers, sizing dies or immersion baths, or any combination thereof.

12. The process of claim 1, wherein said cycloolefin resin is selected from the group consisting of cyclobutene, cyclopentene, cycloheptene, cyclooctene, cyclooctadiene, cyclopentadiene, dicyclopentadiene, 7-oxanorbornene, 7-oxanorbornadiene, tetracyclododecadiene, cyclododecene, cyclononadiene, cyclopentadiene trimers, cyclopentadiene tetramers, and mixtures thereof.

13. The process of claim 12, wherein said cycloolefin resin is a dicyclopentadiene resin.

14. The process of claim 12, wherein said cycloolefin resin is a mixture of dicyclopentadiene and a cyclopentadiene trimer.

15. The process of claim 1, wherein said fiber material is selected from one of the group consisting of flake glass, chopped strand and milled glass.

16. A coating composition suitable for coating reinforcements used to form composites in conjunction with a cycloolefin comprising a ruthenium or osmium ring opening metathesis polymerization catalyst comprising a silane which is N-2-(vinylbenzylamino)-ethyl-3-aminopropyl-trimethoxysilane); an optional pH modifying agent; and optional non-ionic or cationic lubricants present in an amount of from about 0–2.0% by weight of the coating composition.

17. The composition of claim 16, wherein said coating composition further comprises a pH modifying agent selected from the group consisting of hydrochloric acid, acetic acid, formic acid, citric acid, oxalic acid, phosphorous acid, and carbon dioxide.

18. The composition of claim 17, wherein said pH modifying agent is acetic acid.

19. The composition of claim 16, wherein the N-2-(vinylbenzylamino)-ethyl-3-aminopropyl-trimethoxysilane is present in an amount from about 0.05 to about 5.0 percent by weight of the coating composition, and the pH modifying agent is acetic acid, which is present in an amount to give said coating composition a pH of between about 2.75 and about 5.

20. A composite article formed by a process comprising:
    (a) coating a reinforcing fiber material with a coating composition comprising a silane which is N-2-(vinylbenzylamino)-ethyl-3-aminopropyl-trimethoxysilane, an optional pH modifying agent, and an optional lubricant, wherein said silane and lubricant are compatible with ring opening metathesis polymerization (ROMP) catalysts used to initiate ring opening metathesis polymerization of cycloolefin resins, and wherein said lubricant is present in an amount of from about 0–2.0% by weight of the coating composition;

(b) impregnating the coated reinforcing fiber material with a catalyzed resin, the catalyzed resin having been prepared by adding a catalytically effective amount of a ROMP catalyst selected from the group consisting of ruthenium and osmium catalysts to a cycloolefin resin; and (c) allowing the catalyzed resin to polymerize to form the composite article.

21. The composite article of claim 20, wherein said pH modifying agent is acetic acid.

22. A molded composite article comprising (i) a reinforcing fiber material coated with the coating composition of claim 16, and (ii) a cycloolefin resin polymerized using a ruthenium or osmium ring opening metathesis polymerization catalyst.

23. A reinforcing fiber material coated with the coating composition of claim 16.

24. The reinforcing fiber material of claim 23, wherein said reinforcing fiber material is glass fabric or cloth.

25. The process of claim 23, wherein said reinforcing fiber material is selected from the group consisting of flake glass, chopped strand and milled glass.

* * * * *